(12) United States Patent
Heinle et al.

(10) Patent No.: US 11,048,728 B2
(45) Date of Patent: Jun. 29, 2021

(54) DEPENDENT OBJECT ANALYSIS

(71) Applicant: SAP SE, Walldorf (DE)

(72) Inventors: Antje Heinle, Muehlhausen (DE); Daniel Biliniewicz, Walldorf (DE)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 16/217,875

(22) Filed: Dec. 12, 2018

(65) Prior Publication Data
US 2020/0192914 A1    Jun. 18, 2020

(51) Int. Cl.
G06F 16/00 (2019.01)
G06F 16/28 (2019.01)
G06F 16/21 (2019.01)

(52) U.S. Cl.
CPC .......... *G06F 16/285* (2019.01); *G06F 16/212* (2019.01); *G06F 16/28* (2019.01)

(58) Field of Classification Search
CPC ...................................................... G06F 16/28
See application file for complete search history.

(56) References Cited

U.S. PATENT DOCUMENTS

2007/0239763 A1* 10/2007 McKeough ............. G06F 16/22
2017/0206600 A1*  7/2017 Bixby .................... G06Q 40/04

* cited by examiner

*Primary Examiner* — Ajith Jacob
(74) *Attorney, Agent, or Firm* — Mintz Levin Cohn Ferris Glovsky and Popeo, P.C.

(57) ABSTRACT

A method, a system, and a computer program product for performing analysis of object dependencies. A first base object is selected from a plurality of base objects. At least one first dependent object in a plurality of dependent objects depends on the selected first base object. A group of base objects that includes the selected first base object is generated. A second base object in the plurality of base objects is determined. The first dependent object is dependent on the second base object. The determined second base object is grouped with the generated group of base objects. At least one second dependent object in the plurality of dependent objects and its corresponding base object are determined. The corresponding base object is grouped with the generated group of base objects. The generated group of base objects is stored.

20 Claims, 24 Drawing Sheets

| Object Dependency List | |
|---|---|
| Table1 | View1 |
| Table2 | View1 |
| Table3 | View1 |
| Table1 | View2 |
| Table4 | View2 |
| Table2 | View3 |
| Table3 | View3 |
| Table4 | View4 |
| Table5 | View4 |
| | |

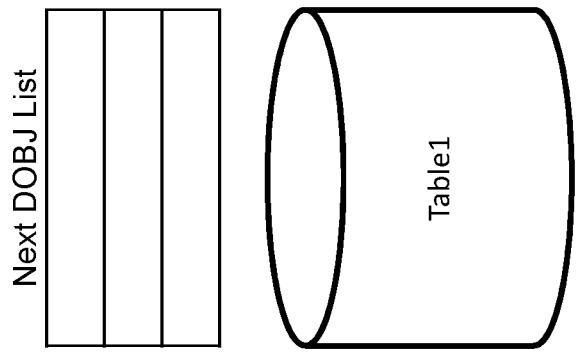
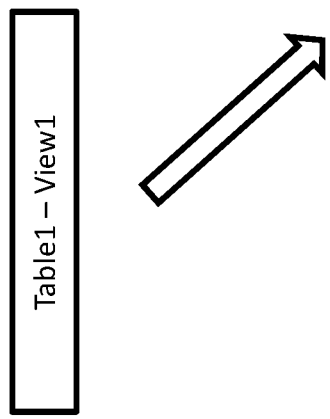
FIG. 3b

| Object Dependency List | |
|---|---|
| Table3 | View1 |
| Table1 | View2 |
| Table4 | View2 |
| Table2 | View3 |
| Table3 | View3 |
| Table4 | View4 |
| Table5 | View4 |

Table2 – View1

| Next DOBJ List | | |
|---|---|---|
| View2 | | |

Table1
Table2

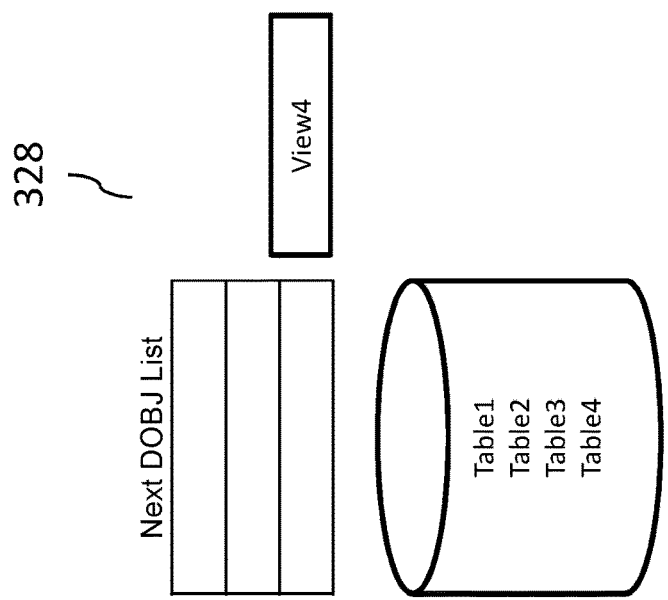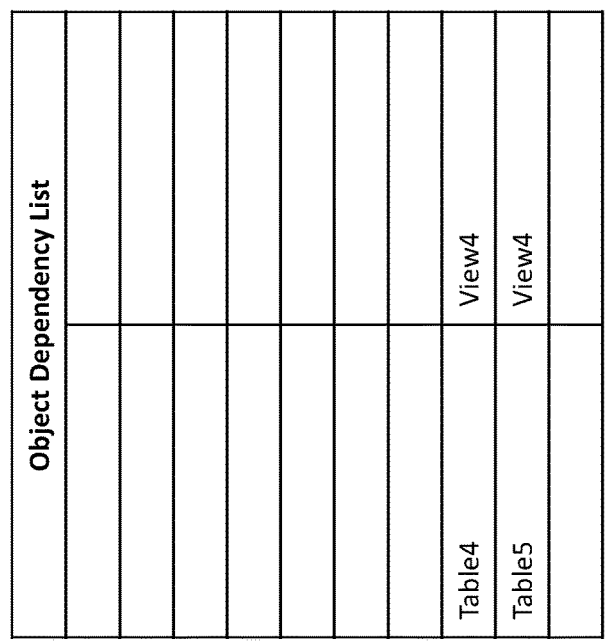
FIG. 3o

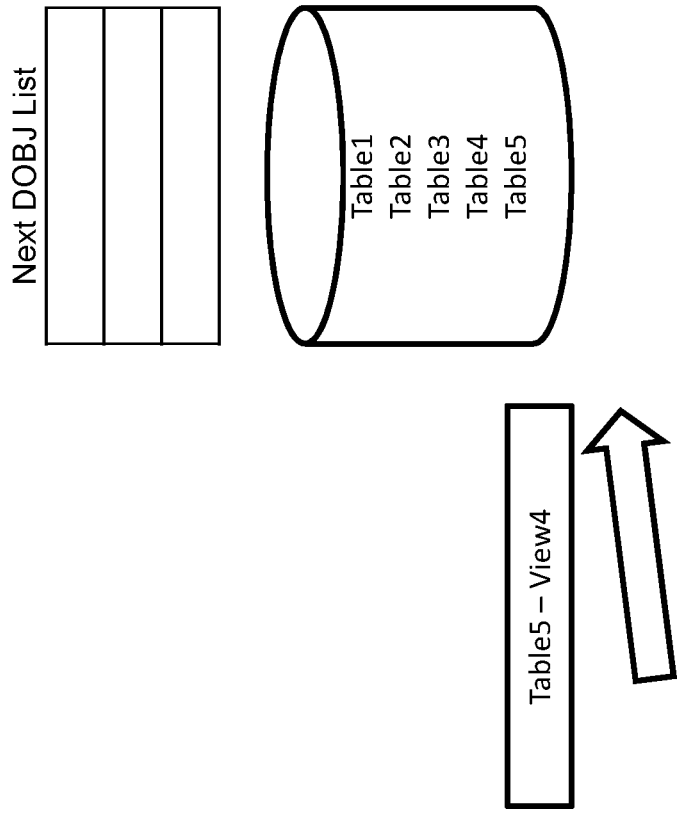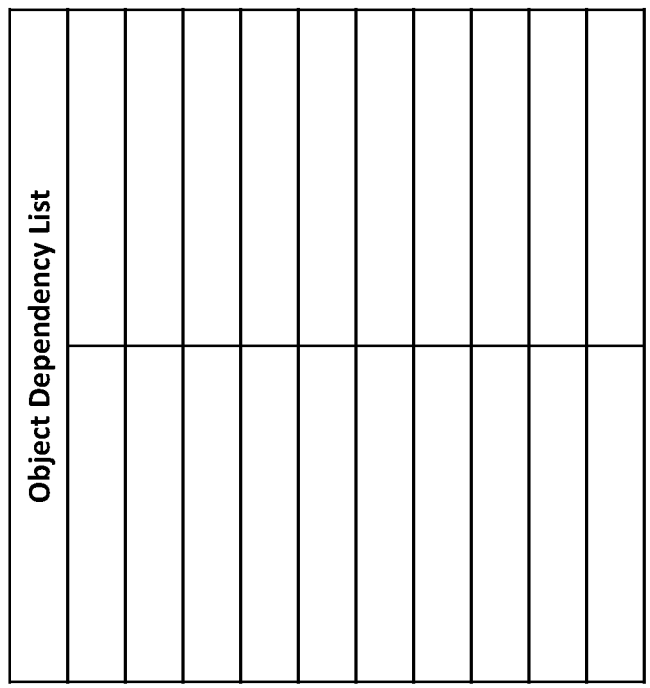
FIG. 3q

DEPENDENT OBJECT ANALYSIS

TECHNICAL FIELD

This disclosure relates generally to data processing and, in particular, to analysis of dependent objects.

BACKGROUND

To ensure that vast amounts of data can be processed and ever-increasing number of operations can performed, modern computing systems are typically scaled out. A scale out landscape should be balanced with regards to query execution count, time, and memory size, while keeping to a minimum an execution count of queries that involve tables on different hosts. An algorithm can be used to group tables to make the execution count distributable and to minimize execution count of queries which involve tables on different hosts. This algorithm is based on an actual statement cache in the system, such as SQL Plan Cache, and is independent of the server landscape, e.g. the number and sizes of the servers. It results in a list of disjoint table groups. Each group includes all tables that are somehow connected via at least one statement in the statement cache.

The problem with the statement cache, at least with the SQL Plan Cache, is that it is volatile and/or unstable when the algorithm runs on a database (e.g., High Performance Analytic Appliance ("HANA") system as developed by SAP SE, Walldorf, Germany), and a list of executed statements is not persisted. So, as soon as the database is restarted, all relevant information may be lost. If tables of a system are to be distributed in a meaningful way so as to avoid cross-node communication in the scale out system, reliable information about the connections of tables is needed. Thus, there is a need for an ability to group objects, e.g., in a more reliable and efficient way.

SUMMARY

In some implementations, the current subject matter relates to a computer-implemented method for performing analysis of object dependencies. The method can include selecting a first base object from a plurality of base objects, where at least one first dependent object in a plurality of dependent objects can depend on the selected first base object, generating a group of base objects that can include the selected first base object, determining a second base object in the plurality of base objects, where the first dependent object is dependent on the second base object, grouping the determined second base object with the generated group of base objects, determining at least one second dependent object in the plurality of dependent objects and its corresponding base object, grouping the corresponding base object with the generated group of base objects, and storing the generated group of base objects.

In some implementations, the current subject matter can include one or more of the following optional features. The method can further include selecting a third base object from the plurality of base objects. At least one third dependent object in the plurality of dependent objects can depend on the third base object, and grouping the selected third base object with the generated group of base objects.

In some implementations, the method can include repeating the selecting, the determining, the determining the second base object, the grouping, and the determining the second dependent object for each dependent object in the plurality of dependent objects. The method can also include generating a second group of base objects using dependencies between selected base objects in the plurality of base objects and corresponding dependent objects in the plurality of dependent objects.

In some implementations, a base object in the plurality of base objects can include at least one of the following: a table, a schema name, an object name, and any combination thereof. A dependent object in the plurality of dependent objects can include at least one of the following: a view, a function, a procedure, and any combination thereof.

In some implementations, the storing operation can include storing grouped base objects on one node in a database system (e.g., HANA database).

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to processing of dependent objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In some implementations, the current subject matter relates to analyzing dependencies among various objects in one or more database structures. Dependencies among objects can be predefined in the database structures. Based on the analysis of dependencies, objects can be grouped together and distributed among different nodes in the database structures. Such grouping and distribution can significantly reduce an amount of compute resources, bandwidth/network consumption, processing time, etc. that it takes to access, retrieve, etc. stored. In one exemplary, non-limiting implementations, the database structures can include a High Performance Analytic Appliance ("HANA") database, which will be described in more detail below. The objects can be tables in the database. The dependent objects types can include a "view", a "function", a "procedure", and/or any other types of objects, and/or any combinations thereof.

In some implementations, the HANA database can be configured to maintain "object dependencies". For example, a "view" object type can include columns of different "base" tables and can be a "dependent object" of these base tables. Other examples can include tables that can be used together in database functions and/or stored procedures. This information can be stored in a HANA database table, called OBJECT_DEPENDENCIES, and can be permanent. The database table can have entries for each "object dependency" that can include: (1) a base object (object type, e.g., "table", schema name, object name, etc.), (2) a dependent object (object type, e.g., "view", schema name, object name, etc.), and (3) a dependency type. In some implementations, nested relationships between objects can also be stored, e.g., a view can be included in another view, used in a procedure, etc. Thus, this view can be a base object for another (dependent) view, procedure, etc.

The current subject matter can allow use of "object dependencies" to group tables in a database structure so that they can be distributed among nodes in the database structure. All tables of a table group can be kept together during table distribution to avoid cross node communication. In some implementations, grouping of objects can be performed in accordance with objects' types (e.g., object dependencies for base objects having type "table" can be selected; similarly, "view", "function" and "procedure" object types, and/or any other object types, and/or any combinations thereof can be used).

In some implementations, all tables belonging to a dependent object (e.g., view, function, procedure, etc.) can be kept together. Additionally, because the same table can be present in different dependent objects, the current subject matter can detect connections among the objects and group all tables accordingly, which can be used in at least one dependent object together. This can result in disjoint table groups, which can be distributed among different nodes of a scale out system.

Figure 1:
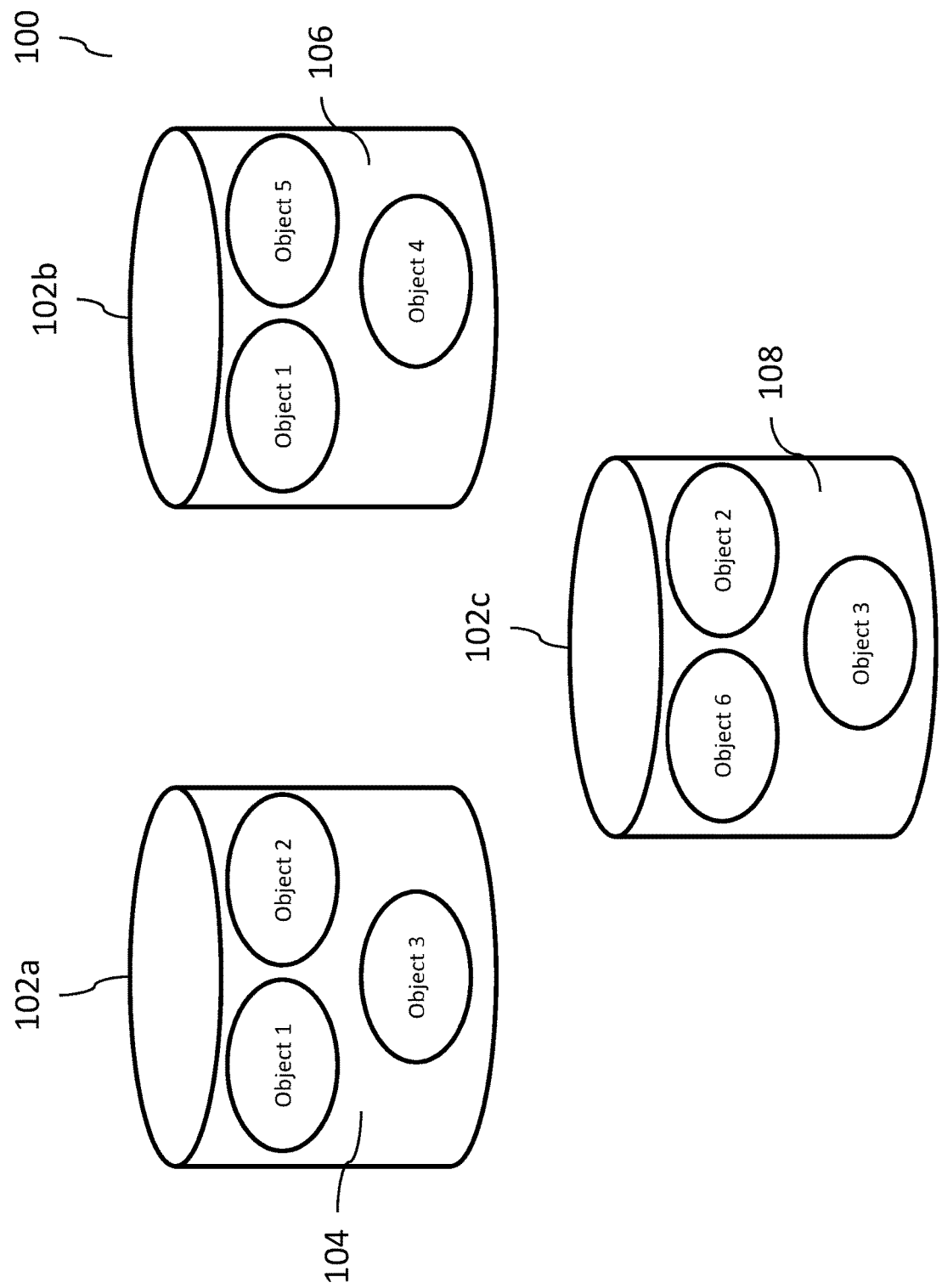
FIG. 1 illustrates an exemplary system for performing analysis of object dependencies, according to some implementations of the current subject matter.

FIG. 1 illustrates an exemplary system 100 that can be used for grouping of objects based on their dependencies, according to some implementations of the current subject matter. The system 100 can be a database structure and can include one or more nodes 102 (a, b, c). Each node 102 can include one or more processor and/or one or more memory locations. The nodes 102 be communicatively coupled with one or another using any type of network, e.g., a wireless, wired, and/or any combination thereof. The nodes 102 can also include any combination of hardware and/or software. The nodes 102 can be configured to store various data that can be queried, accessed, retrieved, etc.

In some implementations, the nodes 102 can store one or more objects 104, 106, 108 (e.g., node 102a can store objects 104 (object 1, object 2, object 3); node 102b can store objects 106 (object 1, object 4, object 5); and node 102c can store objects 108 (object 2, object 3, object 6)). The objects 104-106 and/or one or more portions thereof can be dependent on one another (either within the same node and/or across nodes) in any desired fashion. Dependencies can be manifested in different forms, such as for example, query of data in one object may require data from another object (e.g., an employee table and a department table may be dependent on one another). Because of such dependencies, conventional systems can require inter-node communications to obtain appropriate data. The current subject matter can resolve such requirement as discussed below.

Figure 2:
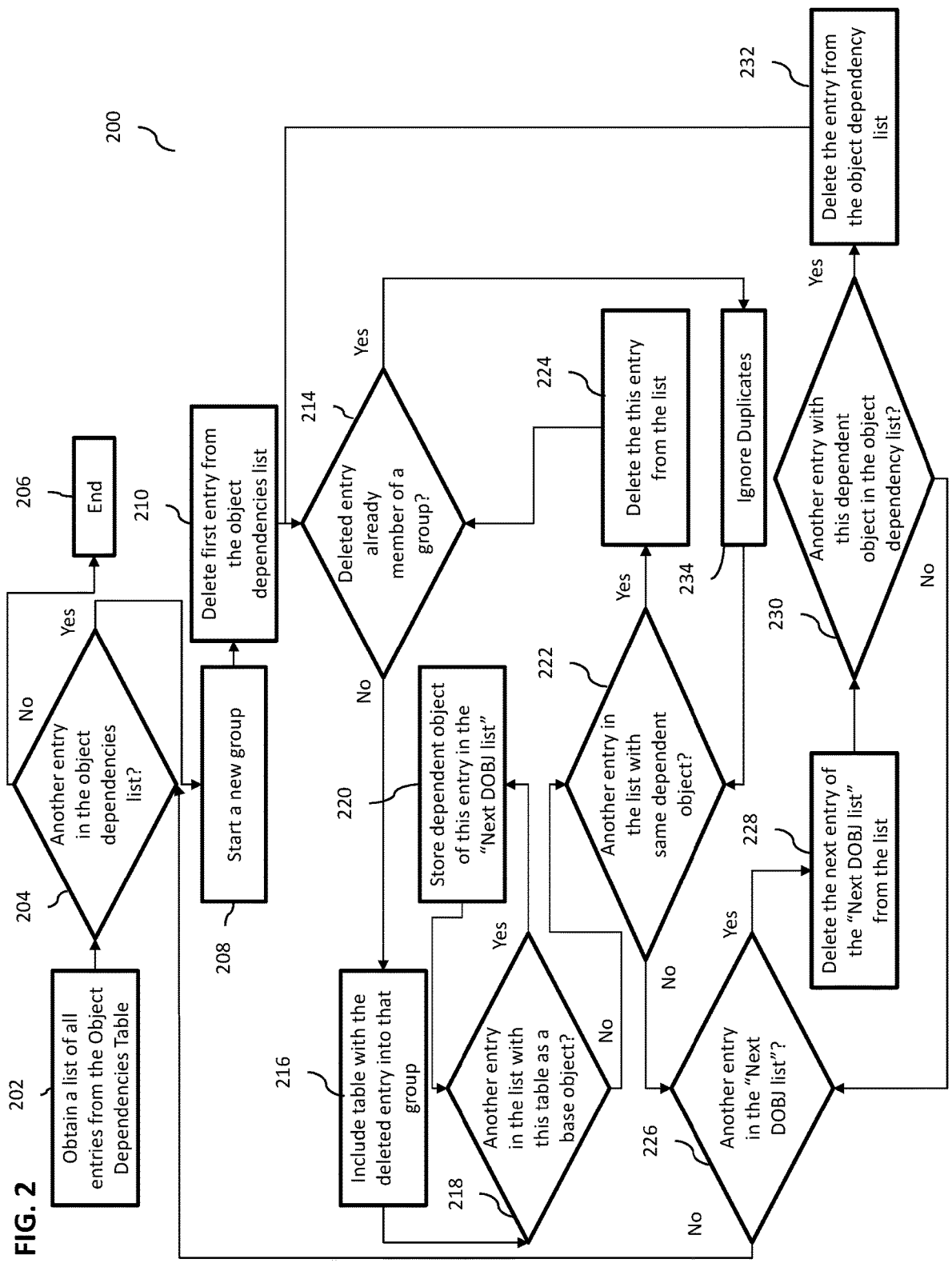
FIG. 2 illustrates an exemplary method for performing analysis of object dependencies, according to some implementations of the current subject matter.

FIG. 2 illustrates an exemplary process 200 for performing dependent object analysis, according to some implementations of the current subject matter. The system 100 can be configured to perform the process 200. FIGS. 3b-3r illustrate exemplary actions (302-334) that can be performed during the process 200 shown in FIG. 2.

In some implementations, the process 200 can involve one or more of the following stages: a preparation stage, a group formation stage, addition of tables to a group stage, collection of object dependencies for other tables, repetition of third and fourth stages until the list of "new" dependent objects is empty, and repetition of second through fifth stages until there no entries left in an "object dependency" list.

An exemplary "object dependency" list or table 300 is shown in FIG. 3a. The table 300 can include a list of object dependencies that can be separated by specific Tables (Table 1-Table 5) and corresponding views (View 1-View 4). For example, Table 1 can include View 1 and View 2, Table 2 can include View 1 and View 3, and so on, as shown in FIG. 3a.

During preparation stage, all entries from the "object dependencies" table 300 (representing a list of pairs of "base object—dependent object relation", i.e., table #-view #) with appropriate types (e.g., as shown in FIG. 3a, tables as base objects and views, functions and procedures as dependent objects (as can be understood other base objects and types can be used)) can be selected, at 202, as shown in FIG. 2.

At 204, the processing proceeds to the next stage (i.e., a group formation stage), where the current subject matter system can determine whether there is an entry in the object dependency list 300 and if so a new group can be formed/started, at 208. Otherwise, the process 200 can terminate, at 206. As shown in FIG. 3b, the first entry on the object dependency list is a base table Table 1 and a dependent object View 1). The table Table 1 can be the first member of a new group, as shown in FIG. 3b.

At 210, once the first entry in the new group is identified and the new group is formed, that entry (i.e., Table 1-View 1) can be removed or deleted from the object dependency list 300, as shown in FIG. 3b. The process 200 can then proceed to the remaining stages to ensure that appropriate groups are formed and that no entries remain on the object dependencies list 300 shown in FIG. 3a. The process 200 can add all tables of the same dependent object to the group, including finding entry with the same dependent object, adding the table to the formed group (while ignoring duplicates), and repeating the previous two operations until there are no new entries with the same dependent object. Then, all object dependencies can be ascertained for another table (e.g., Table 2, Table 3, etc.), including adding first/next table of the group, determining another entry within this table and a different dependent object, storing this entry in a list, and repeating the previous three operations in this stage until there are no new entries within the table as the base object. Following that, next dependent object can be examined and the above process is repeated until the list of "new" dependent objects is empty. Lastly, next group, as described above, can be started and the above process repeated until there are no entries left in the "object dependency" list 300 shown in FIG. 3a.

Referring back to FIG. 2, at 214, the process 200 can determine whether the entry deleted at 210 is already a member of an existing group of tables. If so, the process 200 can proceed to ignore any duplicate entries (as shown in FIGS. 3g, 3i, 3m, 3n, and 3p), at 234, and then determine whether there is another entry in the list with the same dependent object, at 222.

Figure 3C:
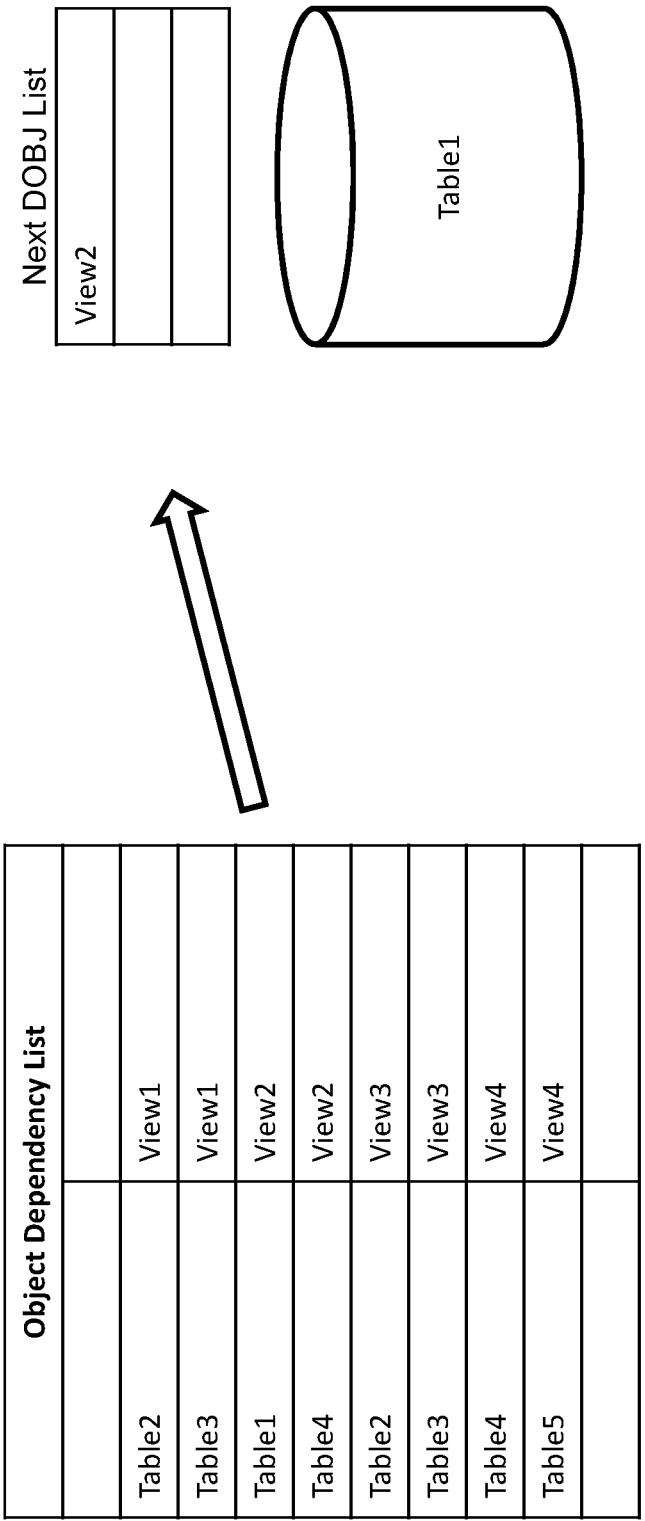
FIG. 3a illustrates an exemplary object dependency list, according to some implementations of the current subject matter.
FIGS. 3b-3r illustrate exemplary actions that can be performed during the process of analyzing object dependencies shown in FIG. 2, according to some implementations of the current subject matter.
Figure 3E:
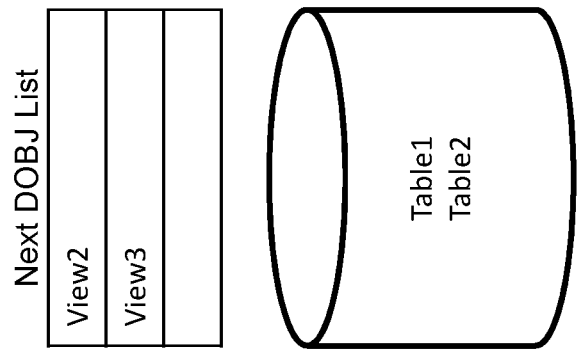
Figure 3F:
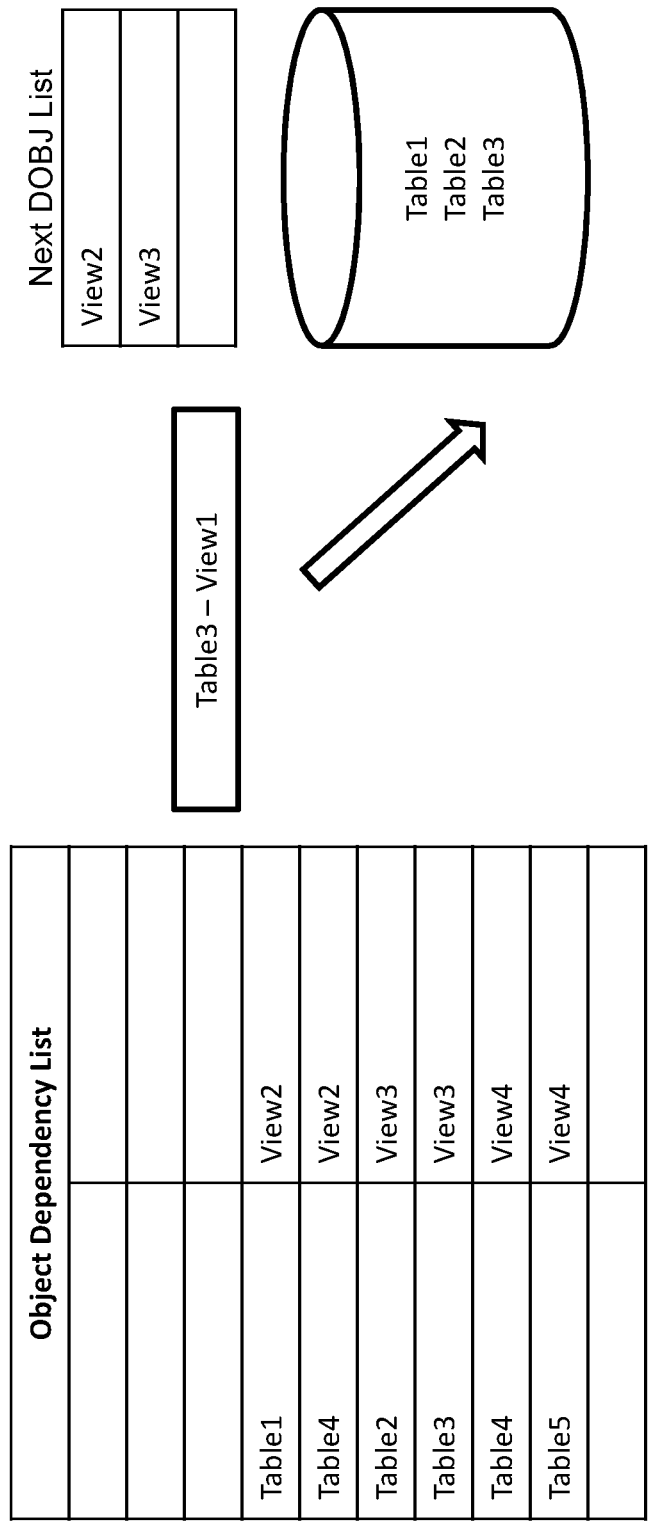
Figure 3G:
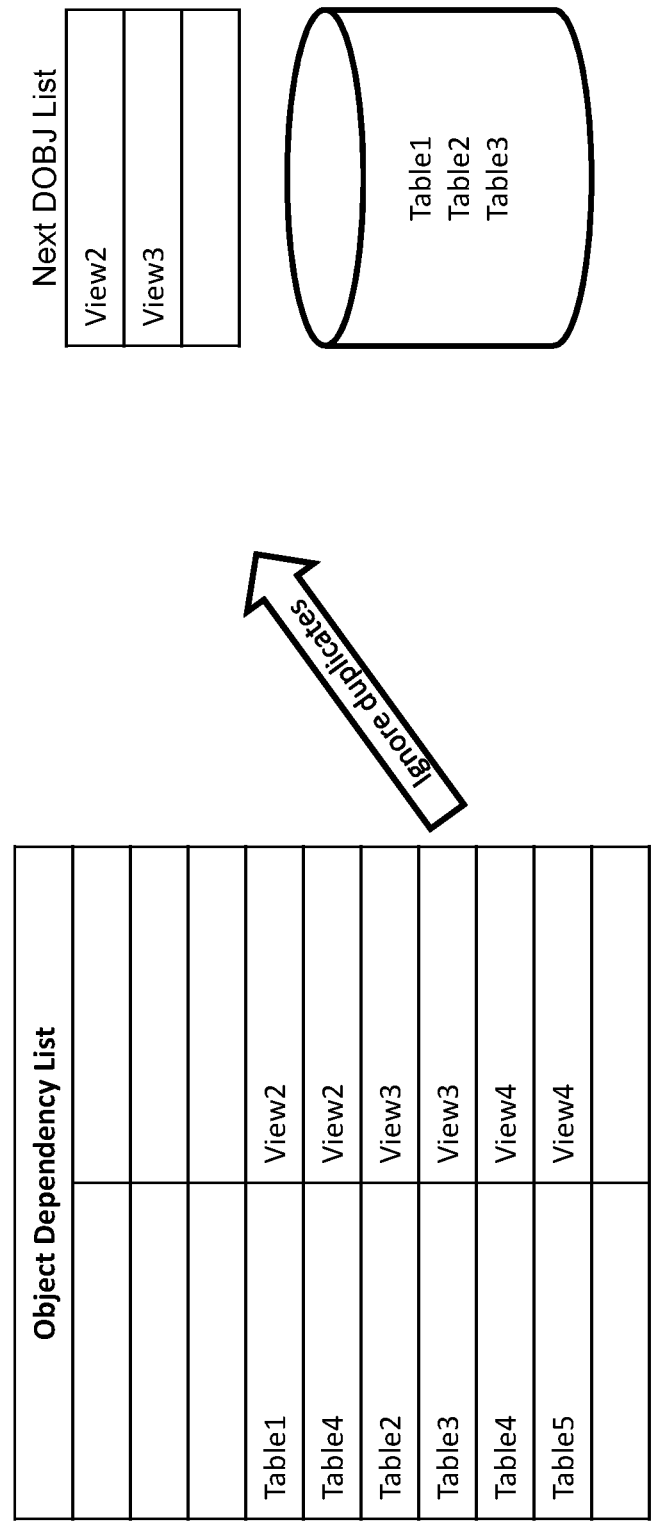

If the deleted entry is not a member of an existing group, at 214, the process 200 can include the table with the deleted entry into the newly formed group (formed at 208), as shown in FIG. 3b. The process 200 can then proceed to search the object dependency list 300 to determine whether there is another entry in the object dependency list 300 that has the same table (i.e., Table 1) as the base object, at 218. If so, the dependent object can be stored in the "next dependent object list ("Next DOBJ list"), at 220. As shown in FIG. 3c, View 2 is dependent on Table 1 and hence, can be stored in the "Next DOBJ list". This process can be repeated until all dependent objects for Table 1 are exhausted.

If there is not another dependent object on the current base table (i.e., Table 1), at 218, the process 200 can proceed to determine whether another entry in the object dependency list has the same dependent object, at 222. If so, this entry can be deleted from the object dependency list, at 224, and the process can return to 214 to determine whether the deleted entry already a member of a group.

If the entry in the list does not have the same dependent object, at 222, the process 200 can determine whether there is another entry in the "Next DOBJ list", at 226. If not, the process 200 can return to determine whether there is another entry in the object dependencies list, at 204 and repeat the process of adding tables to a group or forming a new group.

FIGS. 3d-3f, 3j-3k, and 3q illustrate addition of base tables to the existing group (i.e., Table 2, Table 3, Table 4, and Table 5) as well as addition of dependent objects (that depend on the added base tables) to the "Next DOBJ list" (i.e., View 2, View 3, and View 4). For example, as shown in FIG. 3d, Table 2 (corresponding to the dependency relationship of Table 2-View 1) can be added to the group that already contains Table 1. Similar process can be repeated for other Tables and corresponding dependent Views (in accordance with the object dependency list 300).

Figure 3H:
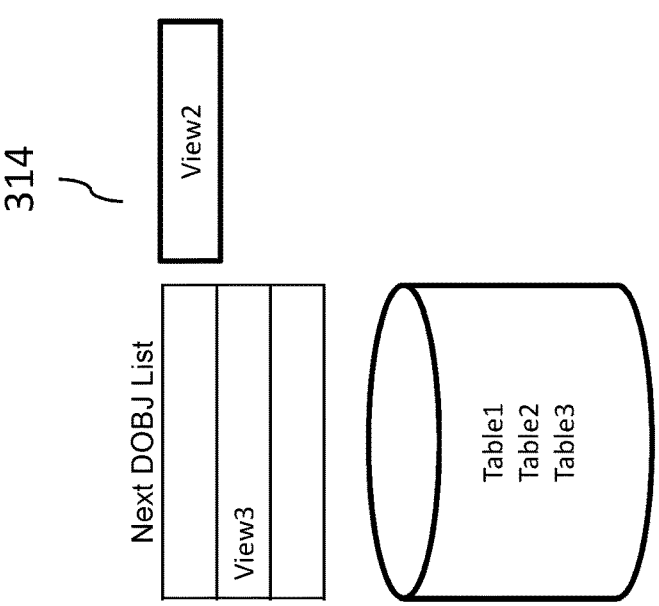

If there is another entry in the "Next DOBJ list", at 226, the process 200 can delete the next entry of the "Next DOBJ list" from that list, at 228. As shown in FIG. 3h, the dependent object View 2 can be deleted from the "Next DOBJ list" upon determination that there is another entry, i.e., View 3. Similar process is shown in FIGS. 3l and 3o with regard to View 3 and View 4 dependent objects.

Figure 3I:
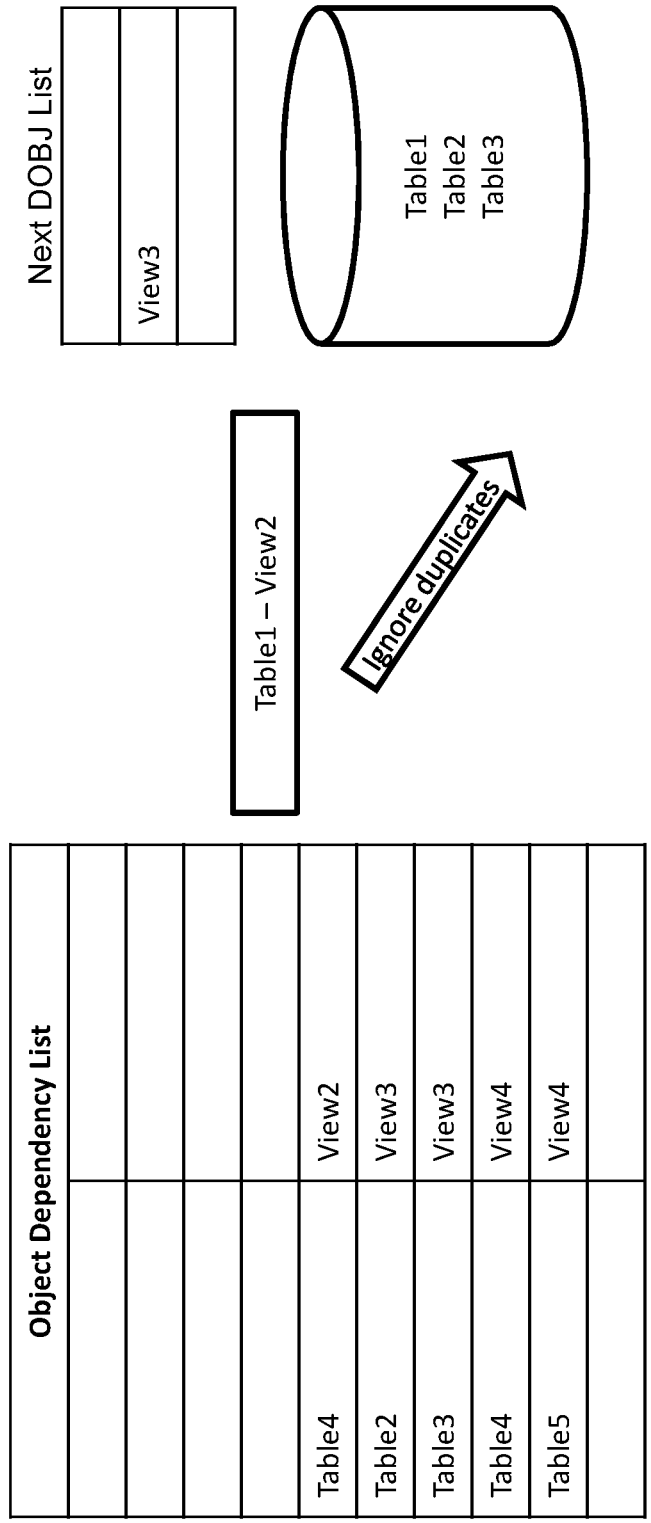
Figure 3J:
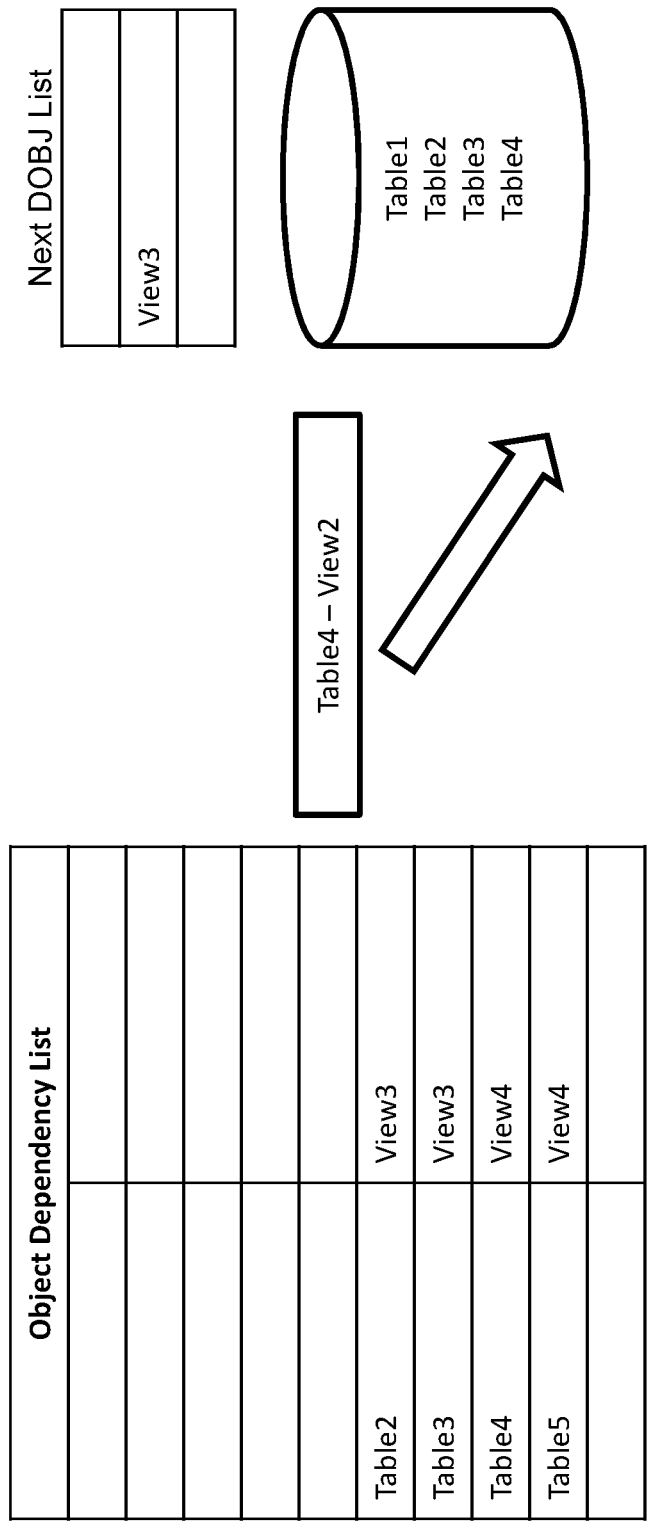
Figure 3K:
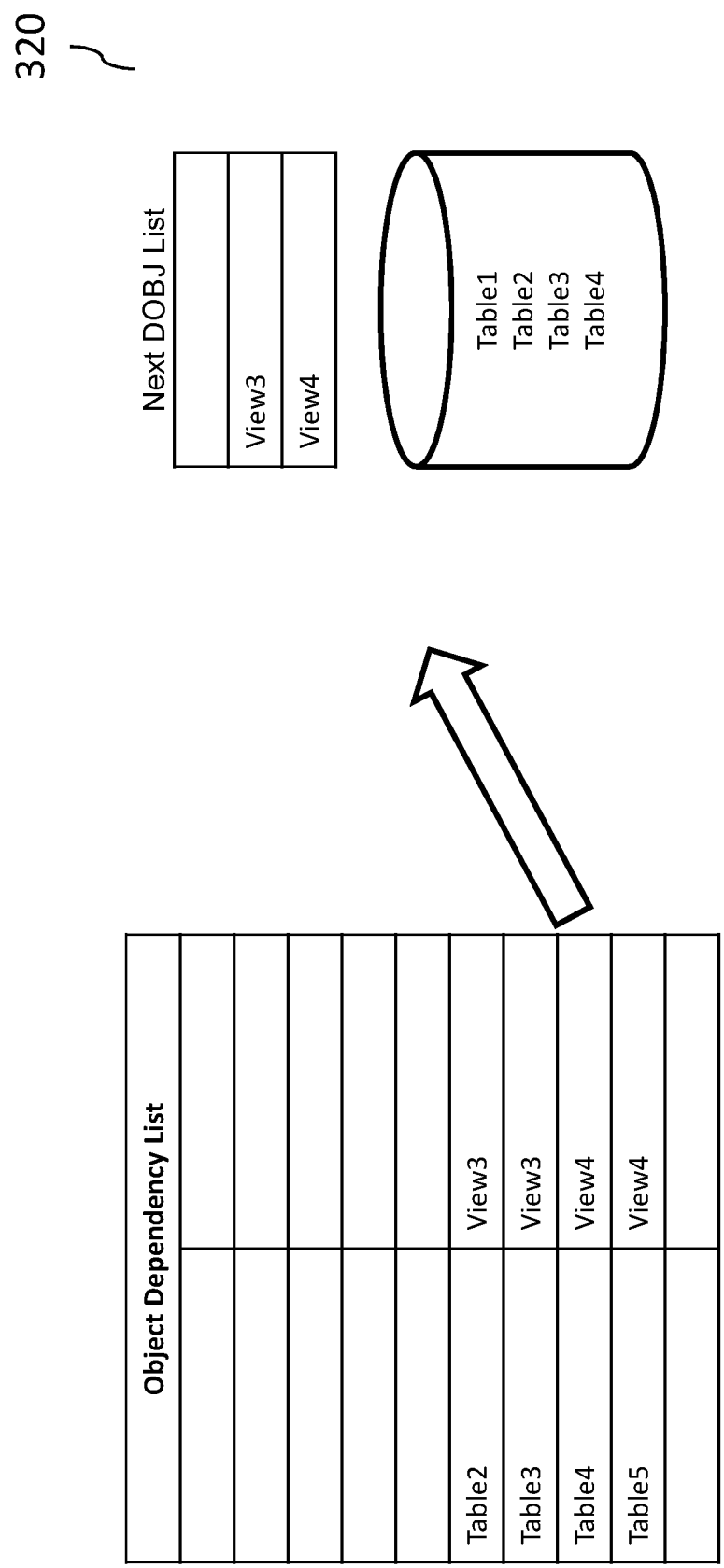
Figure 31:
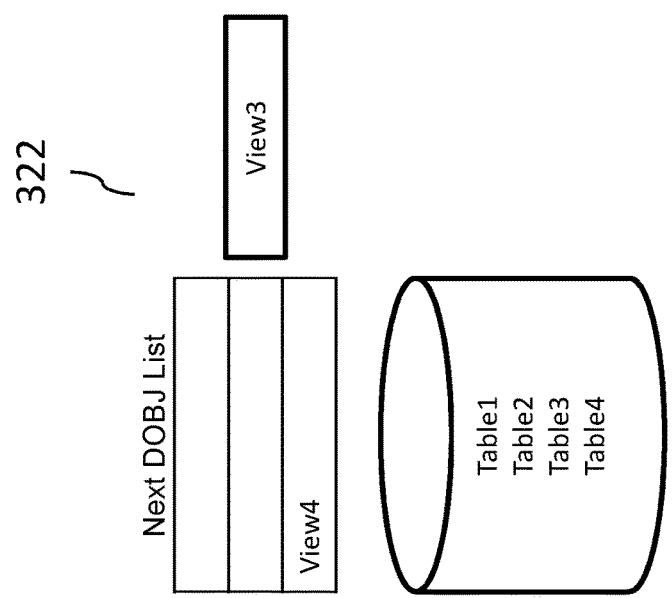
Figure 3M:
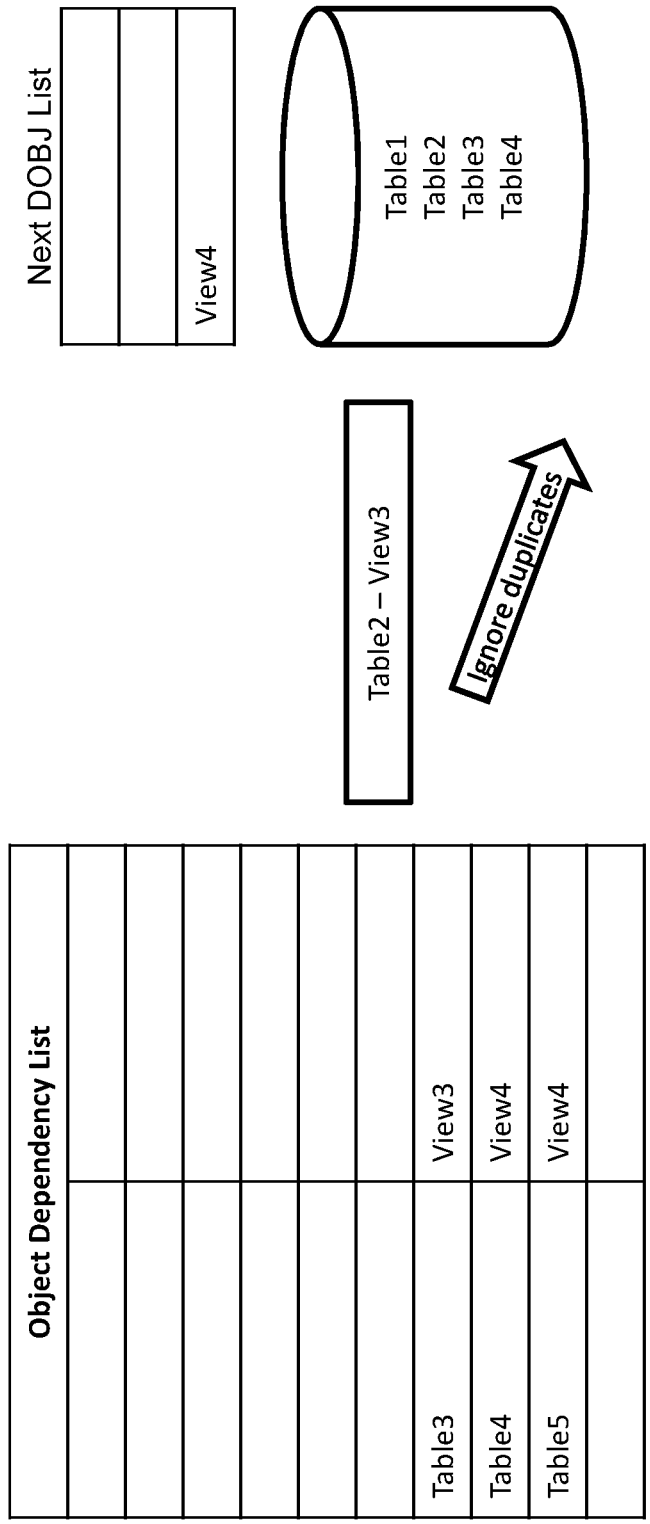
Figure 3N:
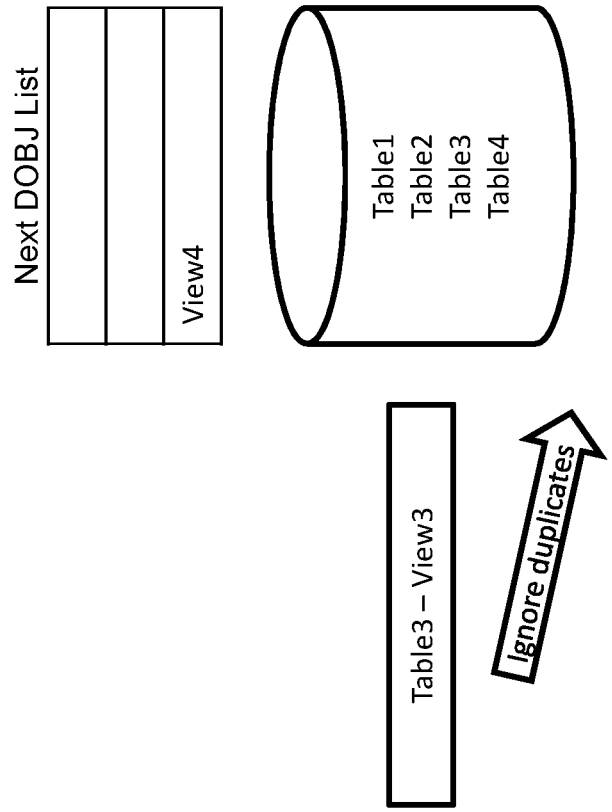
Figure 3P:
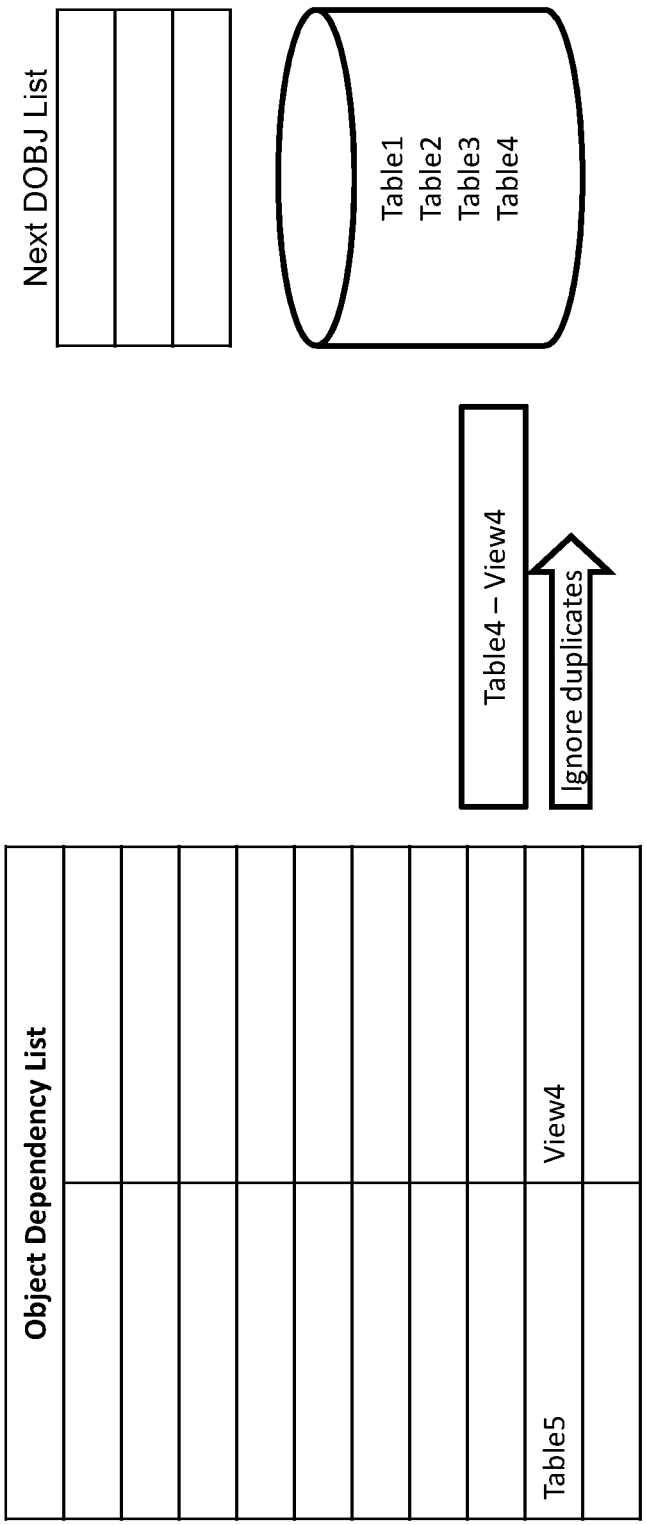
Figure 3R:
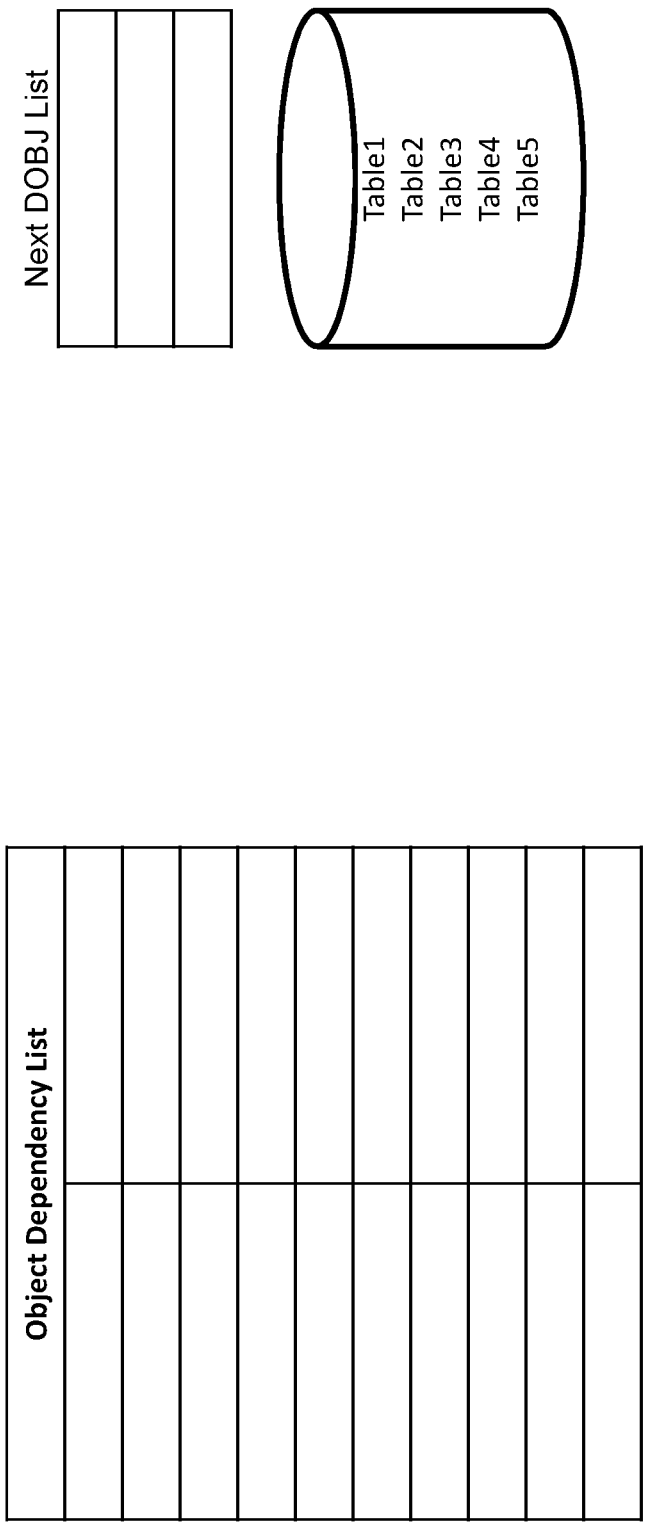

Referring back to FIG. 2, at 230, the process 200 can determine whether there is another entry with this dependent object in the object dependency list (e.g., View 2 depends on Table 1 and Table 4). If so, that entry can be deleted from the object dependency list, as shown in FIGS. 3i-3j (entries Table 1-View 2 and Table 4-View 2 are deleted from the object dependency list), 232. Subsequently, the process 200 can continue to determine whether the deleted entry is already member of an existing group, at 214.

If another entry with this dependent object does not exist in the object dependency list, at 230, the process 200 can determine whether another entry in the "Next DOBJ list" exists, at 226, and if not, the process 200 can return to determine whether another entry in the object dependencies list 300 needs to be examined, at 204.

As stated above, the last phase of the process 200 can include repetition of one or more of its portions until all tables have been grouped into a single group and all of its dependent objects have been removed/deleted from the object dependency list 300 as well as the "Next DOBJ list". As shown in FIG. 3r, Table 1-Table 5 have been grouped into a single group and their dependent objects (i.e., View 1-View 4) have been removed from the object dependency list 300 and the "Next DOBJ list".

In some implementations, as stated above, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
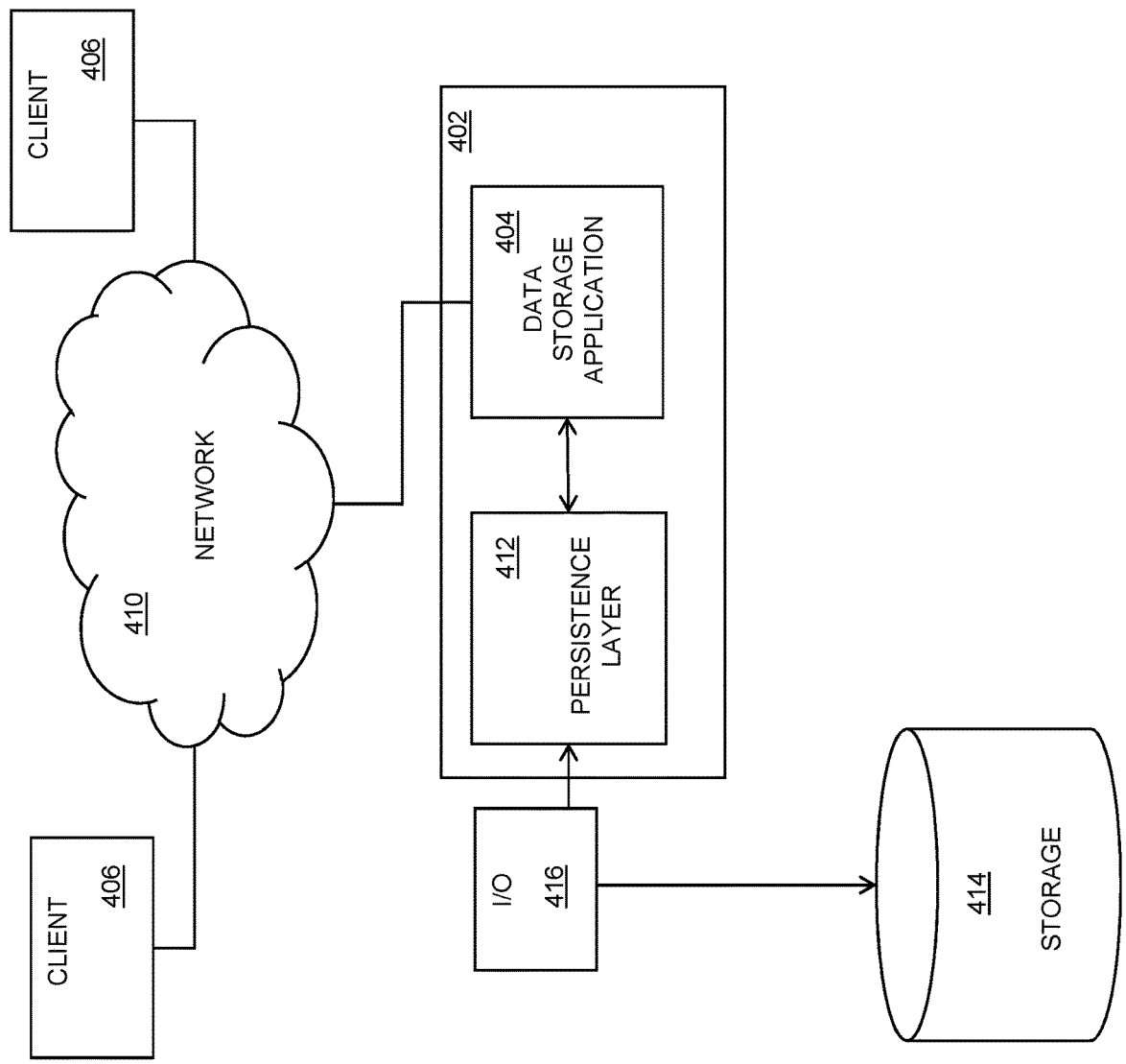
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
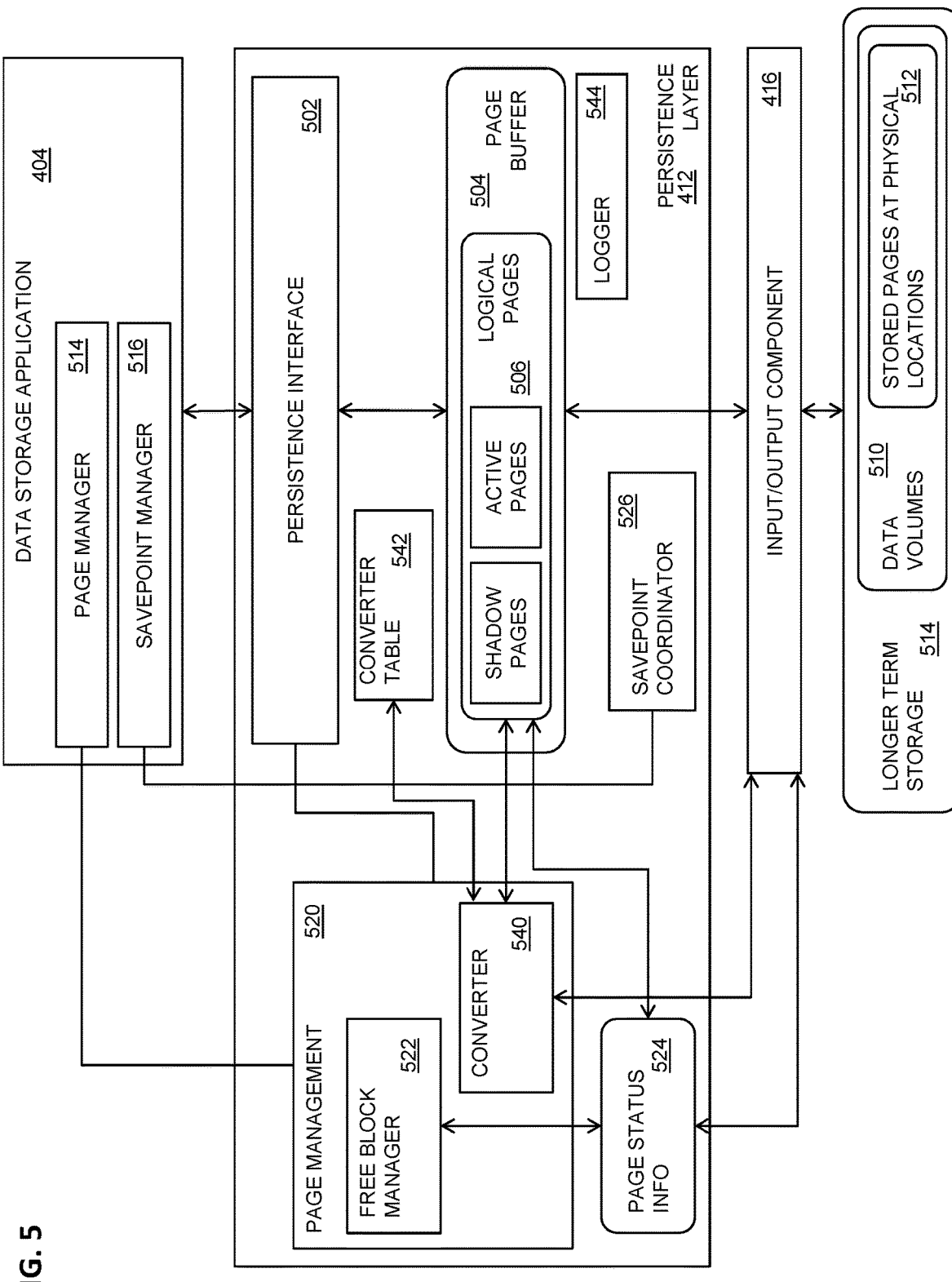
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
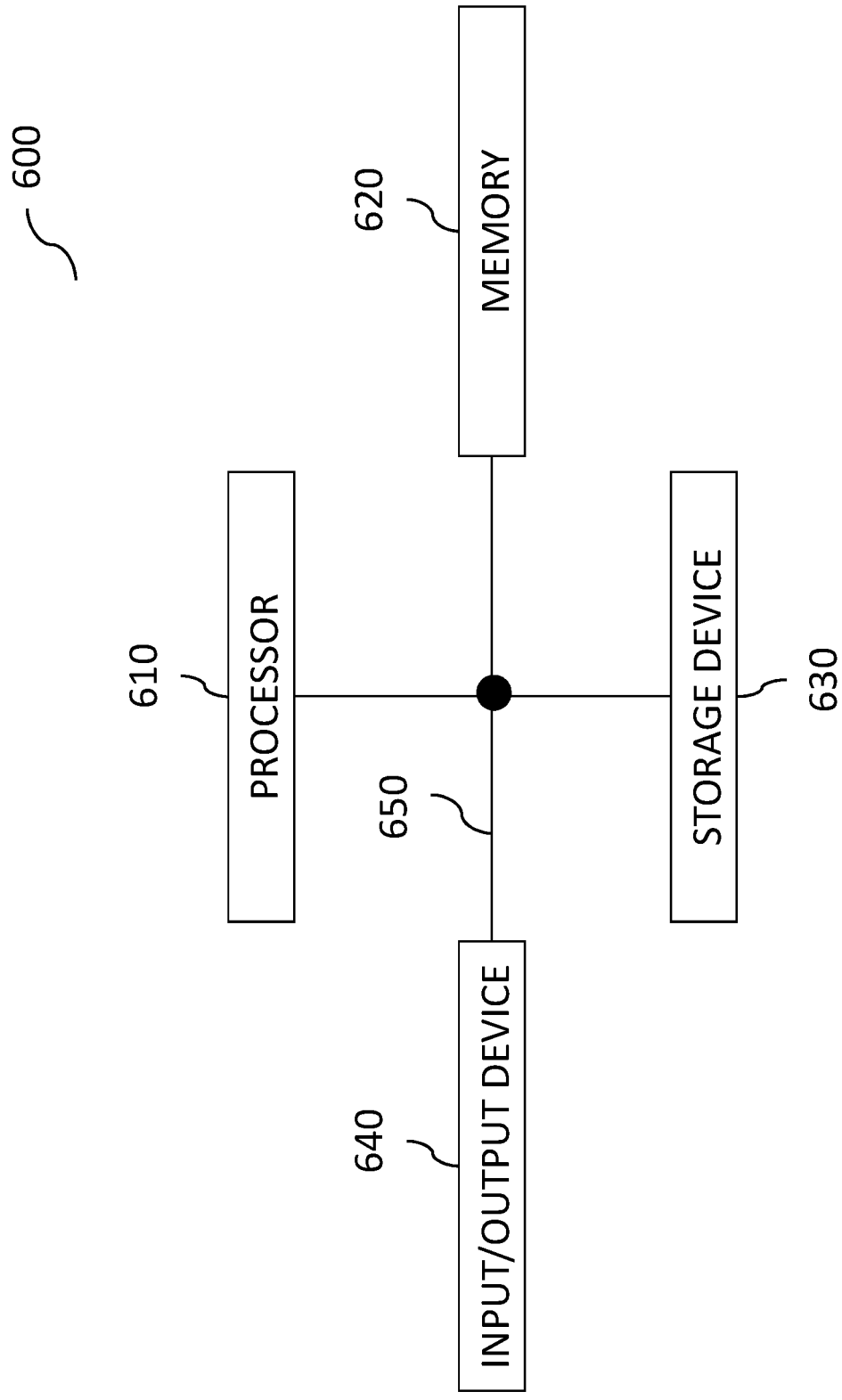
FIG. 6 illustrates an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
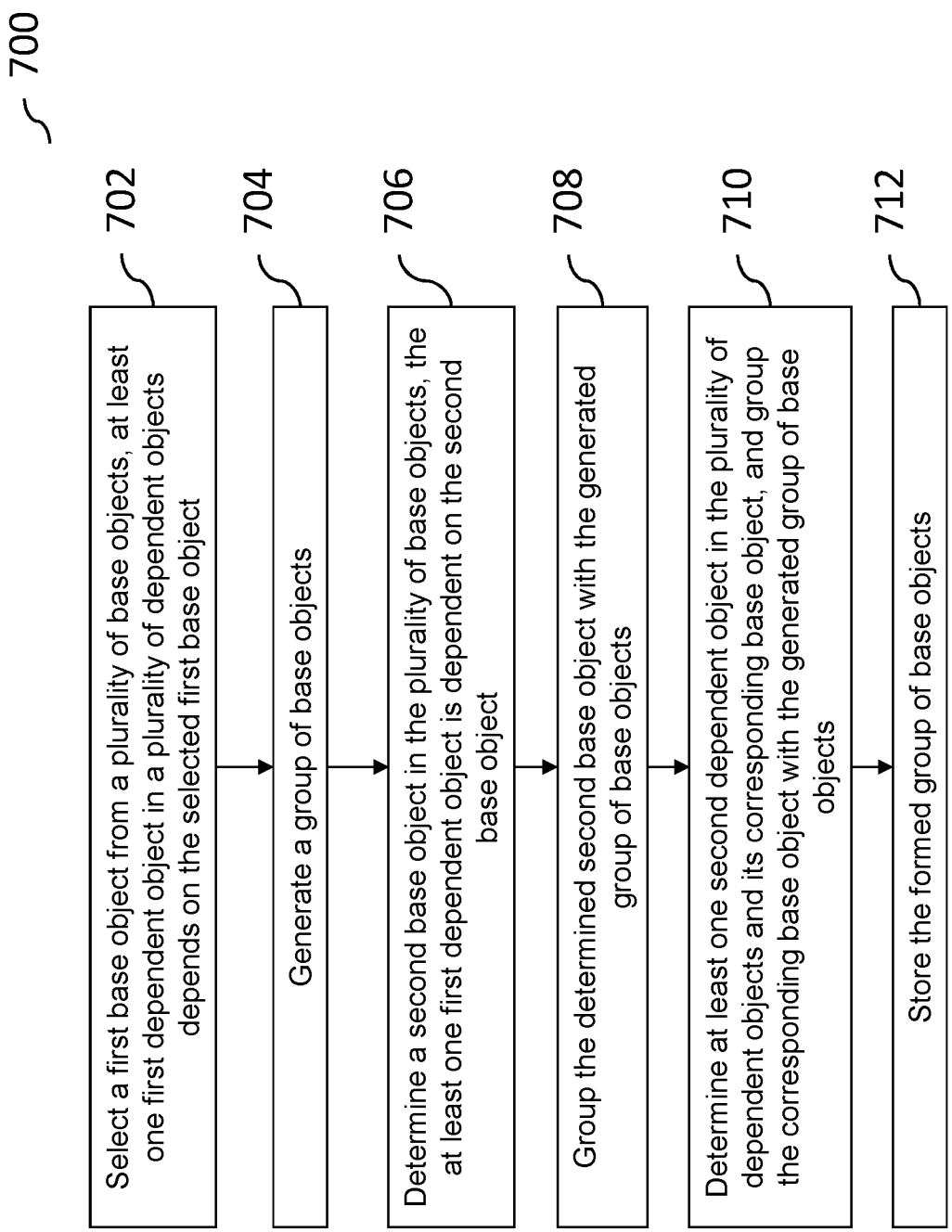
FIG. 7 illustrates an exemplary method, according to some implementations of the current subject matter.

FIG. 7 illustrates an exemplary method 700 for performing analysis of object dependencies, according to some implementations of the current subject matter. At 702, a first base object (e.g., a table) can be selected from a plurality of base objects (shown as a list of tables in the object dependency list 300 in FIG. 3a). At least one first dependent object in a plurality of dependent objects (shown as a list of views in the object dependency list 300 in FIG. 3a) can depend on the selected first base object. At 704, a group of base objects that includes the selected first base object can be generated. At 706, a second base object in the plurality of base objects can be determined. The first dependent object can be dependent on the second base object (e.g., View 2 being dependent on Table 1 and Table 4 as shown in FIG. 3a). At 706, the determined second base object can be grouped with the generated group of base objects. At 708, at least one second dependent object in the plurality of dependent objects and its corresponding base object can be determined. The determined corresponding base object can be grouped with the generated group of base objects. At 710, the generated group of base objects can be stored.

In some implementations, the current subject matter can include one or more of the following optional features. The method 700 can further include selecting a third base object from the plurality of base objects. At least one third dependent object in the plurality of dependent objects can depend on the third base object, and grouping the selected third base object with the generated group of base objects.

In some implementations, the method can include repeating the selecting, the determining the second base object, the grouping, and the determining the second dependent object for each dependent object in the plurality of dependent objects. The method can also include generating a second group of base objects using dependencies between selected base objects in the plurality of base objects and corresponding dependent objects in the plurality of dependent objects.

In some implementations, a base object in the plurality of base objects can include at least one of the following: a table, a schema name, an object name, and any combination thereof. A dependent object in the plurality of dependent objects can include at least one of the following: a view, a function, a procedure, and any combination thereof.

In some implementations, the storing operation can include storing grouped base objects on one node in a database system (e.g., HANA database).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method, comprising:
    selecting a first base object from a plurality of base objects, at least one first dependent object in a plurality of dependent objects depends on the selected first base object;
    generating a group of base objects, the group of base objects including the selected first base object;
    determining a second base object in the plurality of base objects, the at least one first dependent object is dependent on the second base object;
    grouping the determined second base object with the generated group of base objects;
    determining at least one second dependent object in the plurality of dependent objects and its corresponding base object, and grouping the corresponding base object with the generated group of base objects, wherein grouping of at least one of base objects and dependent objects, and the generated group of base objects is performed using a dependency type of and detected connections between at least one of the base objects and the dependent objects, wherein a plurality of tables belonging to a dependent object in the plurality of dependent object are transmitted to a node storing the dependent object for the grouping with the dependent object; and
    storing the generated group of base objects.

2. The method according to claim 1, further comprising selecting a third base object from the plurality of base objects, at least one third dependent object in a plurality of dependent objects depends on the third base object; and
    grouping the selected third base object with the generated group of base objects.

3. The method according to claim 1, further comprising repeating the selecting, the determining the second base object, the grouping, and the determining the at least one second dependent object for each dependent object in the plurality of dependent objects.

4. The method according to claim 1, further comprising generating a second group of base objects using dependencies between selected base objects in the plurality of base objects and corresponding dependent objects in the plurality of dependent objects.

5. The method according to claim 1, wherein a base object in the plurality of base objects includes at least one of the following: a table, a schema name, an object name, and any combination thereof.

6. The method according to claim 1, wherein a dependent object in the plurality of dependent objects includes at least one of the following: a view, a function, a procedure, and any combination thereof.

7. The method according to claim 1, wherein the storing further comprises storing grouped base objects on one node in a database system.

8. A system comprising:
at least one programmable processor; and
a non-transitory machine-readable medium storing instructions that, when executed by the at least one programmable processor, cause the at least one programmable processor to perform operations comprising:
selecting a first base object from a plurality of base objects, at least one first dependent object in a plurality of dependent objects depends on the selected first base object;
generating a group of base objects, the group of base objects including the selected first base object;
determining a second base object in the plurality of base objects, the at least one first dependent object is dependent on the second base object;
grouping the determined second base object with the generated group of base objects;
determining at least one second dependent object in the plurality of dependent objects and its corresponding base object, and grouping the corresponding base object with the generated group of base objects, wherein grouping of at least one of base objects and dependent objects, and the generated group of base objects is performed using a dependency type of and detected connections between at least one of the base objects and the dependent objects, wherein a plurality of tables belonging to a dependent object in the plurality of dependent object are transmitted to a node storing the dependent object for the grouping with the dependent object; and
storing the generated group of base objects.

9. The system according to claim 8, wherein the operations further comprise
selecting a third base object from the plurality of base objects, at least one third dependent object in a plurality of dependent objects depends on the third base object; and
grouping the selected third base object with the generated group of base objects.

10. The system according to claim 8, wherein the operations further comprise repeating the selecting, the determining the second base object, the grouping, and the determining the at least one second dependent object for each dependent object in the plurality of dependent objects.

11. The system according to claim 8, wherein the operations further comprise generating a second group of base objects using dependencies between selected base objects in the plurality of base objects and corresponding dependent objects in the plurality of dependent objects.

12. The system according to claim 8, wherein a base object in the plurality of base objects includes at least one of the following: a table, a schema name, an object name, and any combination thereof.

13. The system according to claim 8, wherein a dependent object in the plurality of dependent objects includes at least one of the following: a view, a function, a procedure, and any combination thereof.

14. The system according to claim 8, wherein the storing further comprises storing grouped base objects on one node in a database system.

15. A computer program product comprising a non-transitory machine-readable medium storing instructions that, when executed by at least one programmable processor, cause the at least one programmable processor to perform operations comprising:
selecting a first base object from a plurality of base objects, at least one first dependent object in a plurality of dependent objects depends on the selected first base object;
generating a group of base objects, the group of base objects including the selected first base object;
determining a second base object in the plurality of base objects, the at least one first dependent object is dependent on the second base object;
grouping the determined second base object with the generated group of base objects;
determining at least one second dependent object in the plurality of dependent objects and its corresponding base object, and grouping the corresponding base object with the generated group of base objects, wherein grouping of at least one of base objects and dependent objects, and the generated group of base objects is performed using a dependency type of and detected connections between at least one of the base objects and the dependent objects, wherein a plurality of tables belonging to a dependent object in the plurality of dependent object are transmitted to a node storing the dependent object for the grouping with the dependent object; and
storing the generated group of base objects.

16. The computer program product according to claim 15, wherein the operations further comprise
selecting a third base object from the plurality of base objects, at least one third dependent object in a plurality of dependent objects depends on the third base object; and
grouping the selected third base object with the generated group of base objects.

17. The computer program product according to claim 15, wherein the operations further comprise repeating the selecting, the determining the second base object, the grouping, and the determining the at least one second dependent object for each dependent object in the plurality of dependent objects.

18. The computer program product according to claim 15, wherein the operations further comprise generating a second group of base objects using dependencies between selected base objects in the plurality of base objects and corresponding dependent objects in the plurality of dependent objects.

19. The computer program product according to claim 15, wherein
a base object in the plurality of base objects includes at least one of the following: a table, a schema name, an object name, and any combination thereof;
a dependent object in the plurality of dependent objects includes at least one of the following: a view, a function, a procedure, and any combination thereof.

20. The computer program product according to claim 15, wherein the storing further comprises storing grouped base objects on one node in a database system.

* * * * *